US008990170B2

(12) United States Patent
Cai et al.

(10) Patent No.: US 8,990,170 B2
(45) Date of Patent: Mar. 24, 2015

(54) METHOD AND APPARATUS FOR DETECTING AN ADDRESS UPDATE

(71) Applicant: International Business Machines Corporation, Armonk, NY (US)

(72) Inventors: Keke Cai, Beijing (CN); HongLei Guo, Beijing (CN); Zhong Su, Beijing (CN); Li Zhang, Beijing (CN); Hui Jia Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 13/661,742

(22) Filed: Oct. 26, 2012

(65) Prior Publication Data

US 2013/0110791 A1 May 2, 2013

(30) Foreign Application Priority Data

Oct. 31, 2011 (CN) .......................... 2011 1 0338453

(51) Int. Cl.
*G06F 17/30* (2006.01)
(52) U.S. Cl.
CPC .... *G06F 17/30002* (2013.01); *G06F 17/30684* (2013.01)
USPC ....................................................... 707/689
(58) Field of Classification Search
CPC ........... G06F 17/30864; G06F 17/3089; Y10S 707/99933
USPC ........................................................ 707/768
See application file for complete search history.

(56) References Cited

U.S. PATENT DOCUMENTS

| 7,099,872 | B2* | 8/2006 | Carpenter et al. ............. 707/710 |
| 8,166,013 | B2* | 4/2012 | Bandaru et al. ............... 707/705 |
| 8,285,656 | B1* | 10/2012 | Chang et al. .................... 706/15 |
| 8,661,002 | B2* | 2/2014 | Smith et al. ................... 707/694 |
| 2002/0052928 | A1* | 5/2002 | Stern et al. .................... 709/218 |
| 2003/0046311 | A1* | 3/2003 | Baidya et al. ................. 707/200 |
| 2004/0093222 | A1* | 5/2004 | Sipe et al. ......................... 705/1 |
| 2008/0228857 | A1* | 9/2008 | Ostertag et al. ............... 709/201 |
| 2009/0031232 | A1* | 1/2009 | Brezina et al. ................ 715/764 |
| 2009/0119268 | A1* | 5/2009 | Bandaru et al. ................... 707/3 |
| 2009/0234853 | A1* | 9/2009 | Gupta et al. ....................... 707/6 |
| 2009/0307212 | A1* | 12/2009 | Ramot et al. ....................... 707/5 |
| 2010/0027527 | A1* | 2/2010 | Higgins et al. ................ 370/351 |
| 2010/0070263 | A1* | 3/2010 | Goto et al. ......................... 704/8 |
| 2010/0131193 | A1 | 5/2010 | Shnyr |
| 2010/0305851 | A1 | 12/2010 | Meyer |
| 2011/0225048 | A1* | 9/2011 | Nair ........................... 705/14.66 |
| 2011/0238735 | A1 | 9/2011 | Gharpure |
| 2012/0173509 | A1* | 7/2012 | Bennett ......................... 707/709 |
| 2012/0240236 | A1* | 9/2012 | Wyatt et al. ...................... 726/25 |
| 2013/0046783 | A1* | 2/2013 | Zhang et al. .................. 707/770 |
| 2013/0067039 | A1* | 3/2013 | Hartzler et al. ............... 709/219 |
| 2013/0166489 | A1* | 6/2013 | Jagota ............................. 706/46 |

* cited by examiner

*Primary Examiner* — Leslie Wong
(74) *Attorney, Agent, or Firm* — Jeff Tang

(57) ABSTRACT

A method and apparatus for obtaining address update information. The method includes: obtaining webpage information related to an address update of a named entity; extracting keywords representing an address update clue of the named entity from the webpage information; determining the time and confidence of the address update clue; determining the address update information based on the time and confidence. Using the solution of the present invention can determine address update information through obtained website information.

28 Claims, 2 Drawing Sheets

METHOD AND APPARATUS FOR DETECTING AN ADDRESS UPDATE

CROSS-REFERENCE TO RELATED APPLICATION

This application claims priority under 35 U.S.C. §119 from Chinese Patent Application No. 201110338453.1 filed Oct. 31, 2011, the entire contents of which are incorporated herein by reference.

BACKGROUND OF THE INVENTION

1. Field of the Invention

The present invention relates to data processing technology, more particularly, to a method and apparatus for detecting an address update by processing data information.

2. Description of Related Art

With the continual development of Internet services, various e-maps have become important tools of assistance in people's work and life, and the provided e-map data information will be outdated due to reasons like changes of addresses, new buildings, city planning, road planning, etc. Usually, map data providers regularly update data. However, such regular updating is time-consuming and tedious. Especially, some newly occurred address change information can not be discovered timely or updated to the e-map database timely, and the outdated map data will affect users' use.

In the prior art there is also a technical solution of updating map data based on the information submitted by a user on his own initiative; however, such a method cannot discover address update information based on the webpage information scattering around on the web.

Therefore, a user will suffer from inconvenience caused by outdated map data, and thus the existing technology needs to be improved, at least the existing technical solutions for updating the address information needs to be improved to some extent.

SUMMARY OF THE INVENTION

One aspect of the present invention provides a method for obtaining address update information, the method including: obtaining data information related to an address update of a named entity; extracting an address update clue of the named entity from the data information; determining the time and confidence of the address update clue; and determining a valid address update clue based on the time and confidence as the address update information.

Another aspect of the present invention provides an apparatus for obtaining address update information, including: obtaining means configured to obtain data information related to an address update of a named entity; address update clue extracting means configured to extract an address update clue of the named entity from the data information; time and confidence determining means configured to determine the time and confidence of the address update clue; and address update information determining means configured to determine a valid address update clue based on the time and confidence as the address update information.

Another aspect of the present invention provides a non-transitory computer readable article of manufacture tangibly embodying computer readable instructions which, when executed, cause a computer to carry out the steps of a method for obtaining address update information, including the steps of: obtaining data information related to an address update of a named entity; extracting an address update clue of the named entity from the data information; determining time and confidence of the address update clue; and determining a valid address update clue based on the time and confidence as the address update information.

BRIEF DESCRIPTION OF THE DRAWINGS

The appended claims set forth the inventive features which are considered as characteristic of the present invention. However, the invention itself and its preferred modes of use, objectives, characteristics and advantages can be better understood by reading the following detailed explanations of the illustrative embodiments with reference to the accompanying drawings, in which:

DETAILED DESCRIPTION OF THE PREFERRED EMBODIMENTS

Figure 1:
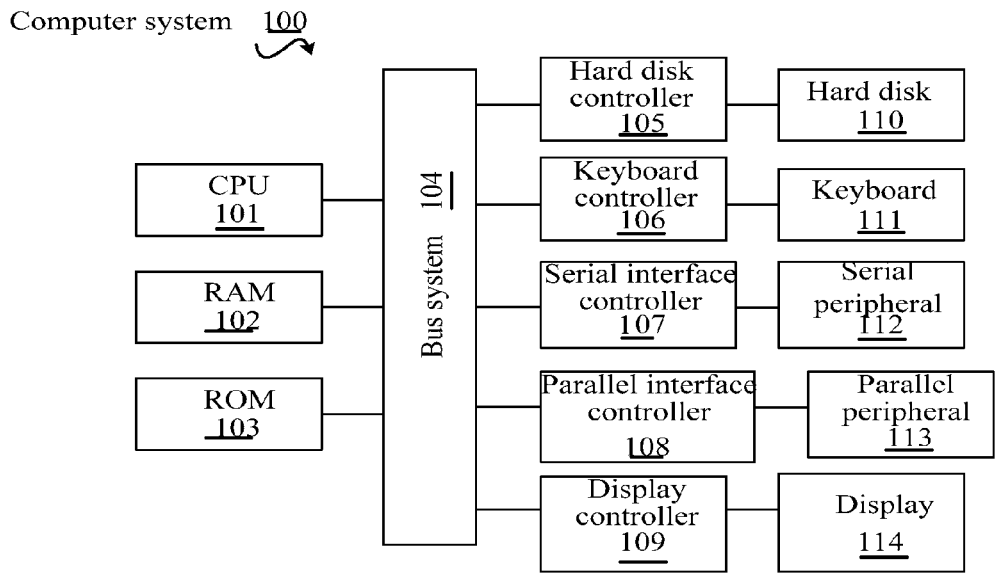
FIG. 1 shows an exemplary computing system for implementing embodiments of the present invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied any tangible mediums of expression having computer readable program code embodied therein.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Now referring to FIG. 1, it shows a block diagram of an exemplary computing system 100 adapted to implement embodiments of the present disclosure. As shown in FIG. 1, computer system 100 can include: CPU (Central Processing Unit) 101, RAM (Random Access Memory) 102, ROM (Read-Only Memory) 103, system bus 104, hard disk controller 105, keyboard controller 106, serial interface controller 107, parallel interface controller 108, display controller 109, hard disc 110, keyboard 111, serial peripheral 112, parallel peripheral 113 and a display 114. Among these devices, CPU 101, RAM 102, ROM 103, hard disc controller 105, keyboard controller 106, serial controller 107, parallel controller 108 and display controller 109 are coupled to system bus 104. Hard disc 110 is coupled to hard disc controller 105; keyboard 111 is coupled to the keyboard controller 106; serial peripheral 112 is coupled to the serial interface controller 107; parallel peripheral 113 is coupled to the parallel interface controller 108, and display 114 is coupled to display controller 119. It shall be appreciated that the structural block diagram of FIG. 1 is merely shown for illustration, rather than limitation to the scope of the disclosure. In some cases, some devices can be added or removed based on specific situations.

Figure 2:
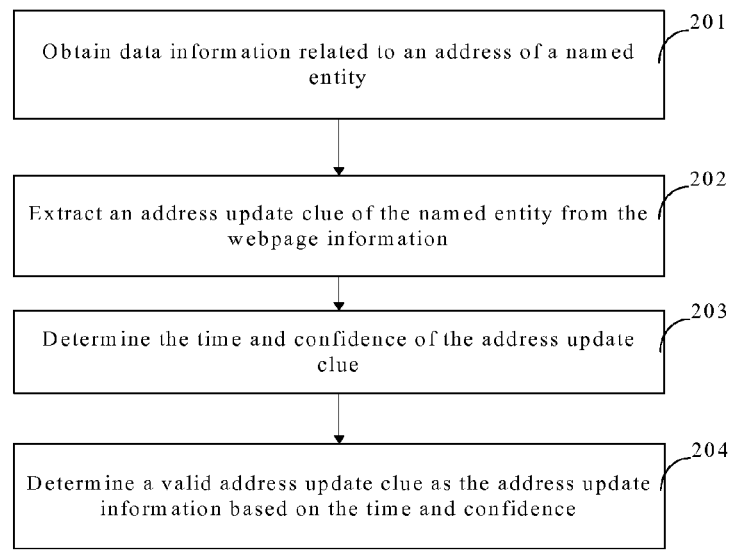
FIG. 2 shows a flowchart of a method for obtaining an address change of a named entity according to one embodiment of the present invention.

Referring to FIG. 2, it shows a flowchart of a method for obtaining an address change of a named entity, which includes the following steps:

At step 201, obtain data information related to an address of a named entity. The data information includes information in any form, e.g., webpage information from the web or any information stored in various storage mediums. The present application is explained by taking webpage information as an example, but this is not limitation to the present invention. Here the webpage information specifically refers to messages released on the web via various devices, and which can be obtained from various websites over the web. Such webpage information from websites includes but is not limited to news provided by web portals, notices by government agencies, main page information of companies, and as well as webpage information of types like microblogs. Webpage information released all the time is usually unstructured, and scattered among various websites. It is different from structured information in specified formats submitted by users on fixed websites, and results in difficulty in processing the information.

The named entity refers to a person's name, name of an organization, name of a place, address and all the other entities identified by names. The identification of a named identity refers to the process of identifying a name of a thing of a specific type in a set of document like webpage information, etc., and it is realized mainly through the following three aspects: identifying a named entity in a text; determining the type of this entity; and when multiple entities denote the same thing, selecting one of the entities as the representative of this group of entities. This can be realized in any existing manners and is not described here.

According to an embodiment of the present invention, it is determined that the webpage information is the webpage information related to the address of a named entity based on the named entity as well as at least one keyword related to an address change being included in the webpage information. In this embodiment, step 201 can include two sub-steps:

Sub-step 1: detect and mark a named entity representing a name of a place or an organization in the webpage information; sub-step 2: detect and mark address update keywords in the webpage information. The following two embodiments can be applied to detect keywords representing an address update in the text of the webpage information.

In one embodiment, a matching method based on a dictionary is applied to detect address update keywords. The keywords included in the dictionary are, e.g., {wrong address, address update, correction, correct address, new address, development, construction completed, open to traffic, merge, settle down, removal, . . . }, and address update keywords are detected in the webpage information by matching with one or more keywords in the dictionary.

In another embodiment, address update keywords are detected by a statistic learning model. For example, the context distribution characteristics of lexical units, parts of speech, semantic categories of words, etc., in training samples are extracted, feature vectors for address update keywords identification are constructed, and an existing machine learning statistic method is used to train an address update keywords identification model. The identification model, when being applied, identifies address update keywords in the present text based on the distribution characteristics (e.g., lexical units, parts of speech, semantic categories of words) of the text.

At step 202, extract an address update clue of the named entity from the webpage information. An update clue usually consists of multiple update information entries, e.g. including entries of {named entity of which the address is updated, address update keywords, target address}. In some cases, the target address can be absent, and this does not affect the value of such an address update clue.

The address update clue can be determined in one of the following manners:

In one embodiment, the address update clue is determined based on explicit address update keywords, because the meaning of the explicit address update keywords themselves, e.g., at least one of {wrong address, address update, correction, correct address, new address}, can clearly express that the address is changed. For example, an obtained webpage message includes the text {the address of our new office is updated as follows: company name: Beijing ABC Co., Ltd.; address of our company office: XXX Floor, XXX Building, Zhongguancun Street, Haidian District, Beijing}. In the webpage message and the replay chain to the message, based on the named entity and the address information around the detected address update keywords, the address update clue can be determined: {address update keywords: "address . . . is updated"; the named entity of which the address changes: "Beijing ABC Co., Ltd."; target address: "XXX Floor, XXX Building, Zhongguancun Street, Haidian District, Beijing"}.

In another embodiment, it is determined based on implicit address update keywords. Such implicit address update keywords, e.g. at least one of {development, construction completed, open to traffic, merge, settle down, removal, . . . }, imply an address change. By detecting a related address change event and the named entity related to the event around the update keywords, an implied update clue is extracted. For example, the webpage message text={In the morning of Can 25, 2011, in front of two elegantly designed office buildings at No. 8 XXX Street, Block C of Zhongguancun West Area, Beijing, people were joyfully celebrating a housewarming ceremony—the opening ceremony of the new office buildings of EFG R&D Group}. In this example, the determined address update clue is implied, and the entries included are {address update keywords: housewarming, the opening ceremony of the new office buildings; named entity: EFG R&D Group; target address: No. 8 XXX Street, Block C of Zhongguancun West Area, Beijing}.

In another embodiment, it is determined based on other place names, surrounding buildings, enterprises or regions appearing together with the named entity as well as relative position to the named entity, etc. included in the context information. For example, from "I'm now at HIJ (China) Company, and to the left of the building are Water Cube and Bird's Nest", can be determined an address update clue={named entity: HIJ (China) Company; context clue: to the left of the building, Water Cube, Bird's Nest}. Thus, the address update information of HIJ Company can be obtained based on the nouns of locality as well as other place names, buildings etc. appearing together included in the context clue.

Step 203, determine the time and confidence of the address update clue. At this step, the focus is the time when the address update event corresponding to the address update clue recorded in the webpage information occurs, not the time of release of the information. At this step, the confidence of the address update clue can be determined in one of the following implementations or a combination thereof:

In one implementation, the confidence is determined based on the action of the author of the webpage information. When the address update event in the webpage information has been validated, it is deemed as having a high confidence; news or information that has not been verified, e.g., forwarded another's message, or news from other websites, is deemed as having a low confidence.

For example, assume the obtained webpage information is "I went to XXX Restaurant yesterday, and its address is changed to XXX road crossing now". It is prior art to determine whether an address update event has been validated by analyzing the sentence, and specifically the check of the confidence can be performed by the following steps:

A) Use word segmentation to obtain word units={"I", "yesterday", "went", "XXX Restaurant"};

B) Identify parts of speech of some word units={I (pronoun), yesterday (adverb), went (verb), XXX Restaurant (organization)};

C) Use syntax analysis to obtain a syntax tree={predicate: went; subject: I; temporal adverbial: yesterday; location adverbial: XXX Restaurant};

D) Based on the syntax tree, extract validation behavior: through the subject "I" and the predicate "went", the webpage information can be deemed as validated information, and has a high confidence.

In another implementation, it can also be determined by the authority of the author of the webpage information, and the authority can be determined by factors such as the author's identify, reputation or history. For example, the company, as the author of the news to disclose its own address change, is deemed as having a high confidence.

In another implementation, the support degree in the reply chain is determined based on the expressions of agreement or disagreement in the replies to or comments on the webpage information. Specifically, it is obtained by analyzing keywords representing approval, e.g., "agree", "disagree", "support", "oppose", "incorrect", "wrong", "right", "correct", "approve", or a syntactical structure representing approval.

At step 204, a valid address update clue is determined as the address update information based on the time and confidence, by selecting an address change information with a higher confidence within a predetermined time period, or by selecting, among a plurality of pieces of address change information with a higher confidences, a more recent piece of address change information. Or the address update clue with the highest confidence and with the time within a predetermined time period, or the address update clue with the confidence within a predetermined range and with the time being the most recent, can be selected.

Further, as an optional step, after step 204, an address correction operation is determined based on the address update keywords in the valid address update clue. The type of the address correction operation can be, e.g., one or more of amending the address, adding a new address and deleting the address. In one embodiment, based on the keywords "newly built" (road, high-rise building), a correction operation is determined to be "adding a new address"; based on the keywords "wrong address", a correction operation is determined to be "deleting the address"; based on the keywords "merge, address update, correct, new address", etc., a correction operation is determined to be "amending address". Those skilled in the art can create the corresponding relationship between the other address update keywords and the address correction operation. An address change alarm can be provided based on the valid address update clue, or update of the map data can be performed directly based on the valid address update clue.

Figure 3:
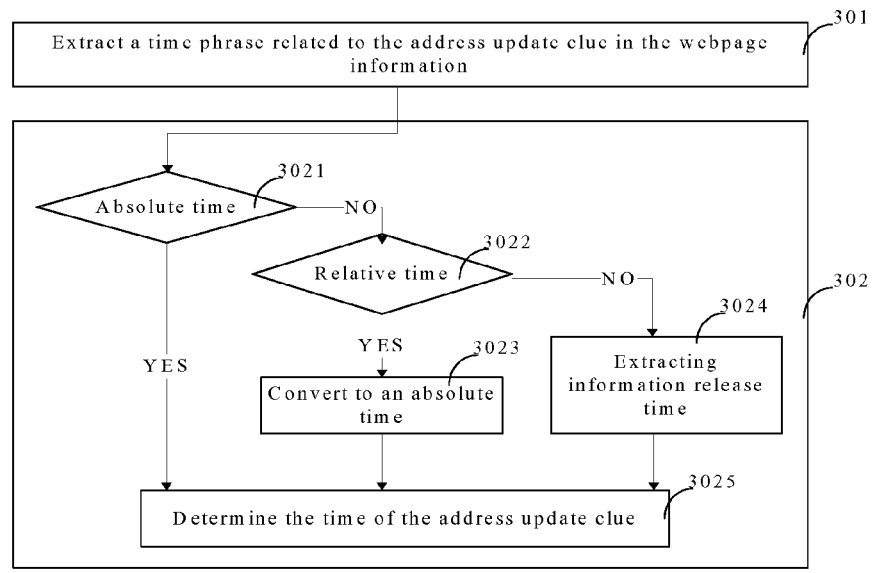
FIG. 3 shows a flowchart of determining the time of step 203 shown in FIG. 2.

FIG. 3 shows an embodiment disclosed by the present invention, showing a flowchart of step 203 shown in FIG. 2. It can include the following steps:

At step 301, detect a time phrase related to the address update clue in the webpage information;

At step 302, convert the time phrase into an absolute time. According to an implementation, step 302 can be implemented by the following steps:

At step 3021, determine whether the time phase as a time clue is an absolute time; in response to that the time phase is an absolute time, at step 3025, directly determine it as the time of the address update event. Here the explicit absolute time refers to time information in various formats. For example, for the web message "In the morning of Can 25, 2011, in front of two elegantly designed office buildings at No. 8 XXX Street, Block C of Zhongguancun West Area, Beijing, people were joyfully celebrating a housewarming ceremony—the opening ceremony of the new office buildings of EFG R&D Group", Mary 25, 2011 is a clearly expressed absolute time.

At step 3022, determine whether the time phrase as a time clue is a relative time, and in response to that the time keywords are an implied relative time, convert it to an absolute time at step 3023, and then at step 3025, use it as the time of the address update event. In response to that the time keywords are not a relative time, proceed to step 3024. For example, today, yesterday, last week, etc., express relative times. In such a case, the implied relative time clue can be converted into the time stamp of the address update event based on another absolute time that can be obtained from the context, the reply chain and the comment history of the released information. For example, "Today is the first day that EFG Research (Asia) does the office work in the new office building; in the entire morning, colleagues are busy tidying things on their own brand-new seats; if they encounter other colleagues taking a leisure walk and visiting around, they will greet each other and ask for each other's new seats. From now on, we will clearly remember a new address: XXX Building, No. 8 XXX Street, Block C of Zhongguancun West Area, Beijing, and this is EFG Research (Asia) . . . ".

At step 3024, it can be deemed that no time terms are detected, and the time of release of the web page information is extracted, and at step 3025, it is used as the time of the address update clue.

Figure 4:
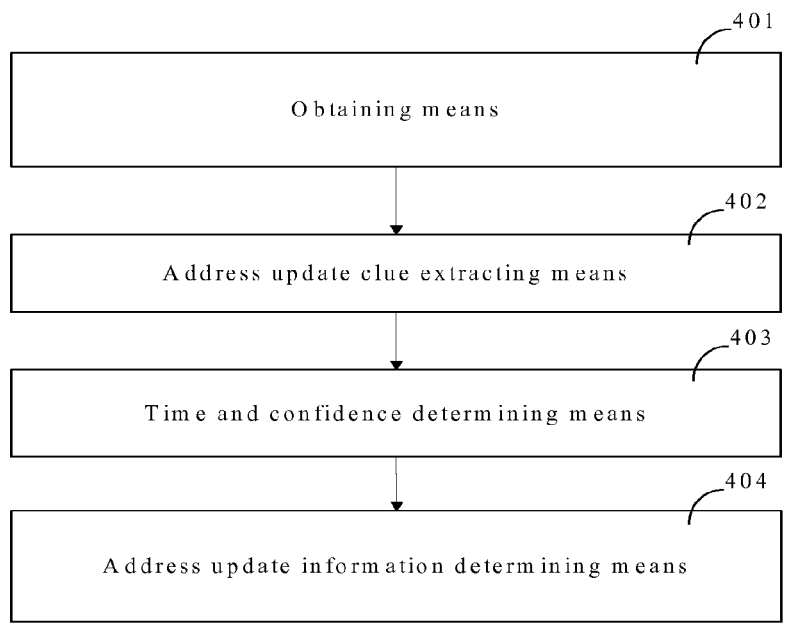
FIG. 4 shows a schematic diagram of an apparatus for obtaining address change of a named entity according to one embodiment of the present invention.

By implementing the above disclosed method process in the computer system shown in FIG. 1, the present application is further embodied as an apparatus for obtaining address update information of a named entity. FIG. 4 shows a schematic block diagram of this apparatus, mainly including: obtaining means 401 configured to obtain data information related to an address update of a named entity; address update clue extracting means 402 configured to extract an address update clue of the named entity from the webpage information; time and confidence determining means 403 configured to determine the time and confidence of the address update clue; and address update information determining means 404 configured to determine a valid address update clue as the address update information based on the time and confidence.

In an embodiment, the obtaining means, based on that the data information includes a named entity and at least one address update keyword, obtain the data information related to the address update of the named entity.

In one embodiment, the address update clue includes the named entity of which the address is updated, address update keywords and a target address.

In an embodiment, the address update clue extracting means includes: means for detecting, in the data information, a time phrase related to the address update clue; means for determining an absolute time of the address update clue based on the detection result of the time phrase.

In an embodiment, the means for determining an absolute time of the address update clue based on the detection result of the time phrase includes: means for, in response to that the time phrase is an absolute time, directly determining it as the time of the address update clue; means for, in response to that the time phrase is a relative time, converting it into an absolute time as the time of the determined address update clue; means for, in response to not detecting any time term, directly determining the time of release of the webpage information as the time of the address update clue.

In an embodiment, the time and confidence determining means includes at least one of the following means: means for determining based on the degree that the data information is verified, where when the data information has been verified, it has a higher confidence; and when the data information is only forwarded, it has a lower confidence; means for determining based on the support degree information obtained from comments on the data information; means for determining based on the authority of the author of the data information.

In an embodiment, the address update information determining means includes: means for selecting an address update clue with the highest confidence and with the time within a predetermined time period, or means for selecting an address update clue with the confidence within a predetermined range and with the time being the most recent.

In one embodiment, it further includes means for determining an address correction operation based on the address update keywords in the valid address update clue.

In one embodiment, the address correction operation is one or more of amending the address, adding a new address, deleting the address.

In one embodiment, it further includes: means for providing an address change alert or directly updating map data based on the address update information.

The above descriptions is only exemplary, rather than limitation to the present invention. The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions

The invention claimed is:

1. A method for obtaining address update information, the method comprising:
   obtaining data information related to an address update of a named entity;
   extracting an address update clue of the named entity from the data information;
   determining time and confidence of the address update clue, wherein the time of the address update clue corresponds to an occurrence of an address update event; and
   determining a valid address update clue based on the time and confidence as the address update information;
   wherein determining the time of the address update clue comprises:
   detecting, in the data information, a time phrase related to the address update clue; and
   determining an absolute time of the address update clue based on the detection result of the time phrase; and
   wherein determining the absolute time of the address update clue based on the detection result of the time phrase comprises:
   in response to the time phrase being an absolute time, determining the absolute time as the time of the address update clue;
   in response to the time phrase being an relative time, determining, after converting it into an absolute time, the absolute time as the time of the address update clue; and
   in response to not detecting any time term related to the address update clue, determining the time of release of the data information as the time of the address update clue.

2. The method of claim 1, wherein the data information related to the address update of the named entity is obtained when the data information includes the named entity and at least one address update keyword.

3. The method of claim 1, wherein the address update clue includes (i) the named entity of which the address is updated, (ii) address update keywords and (iii) a target address.

4. The method of claim 1, wherein the confidence is determined based on the degree that the data information is validated, wherein, when the data information has been validated, it has a higher confidence, and when the data information is merely forwarded, it has a lower confidence.

5. The method of claim 1, wherein the confidence is determined based on the support degree information obtained from comments on the data information.

6. The method of claim 1, wherein the confidence is determined based on authority of an author of the data information.

7. The method of claim 1, wherein determining the valid address update clue based on the time and the confidence comprises:
   selecting the address update clue with the highest confidence and with the time within a predetermined time period.

8. The method of claim 1, wherein determining the valid address update clue based on the time and the confidence comprises:
   selecting the address update clue with the confidence within a predetermined range and with the time being the most recent.

9. The method of claim 1, further comprising determining an address correction operation based on the address update keywords in the valid address update clue.

10. The method of claim 9, wherein the address correction operation comprises amending the address.

11. The method of claim 9, wherein the address correction operation comprises adding a new address.

12. The method of claim 9, wherein the address correction operation comprises deleting the address.

13. The method of claim 1, further comprising providing an address change alert.

14. The method of claim 1, further comprising directly updating map data based on the address update information.

15. An apparatus for obtaining address update information, comprising:
    a memory;
    a processor device coupled to the memory;
    a module for obtaining address update information coupled to the memory and the processor device to carry out the steps of a method comprising:
    obtaining data information related to an address update of a named entity;
    extracting an address update clue of the named entity from the data information;
    determining time and confidence of the address update clue, wherein the time of the address update clue corresponds to an occurrence of an address update event; and
    determining a valid address update clue based on the time and confidence as the address update information;
    wherein determining the time of the address update clue comprises:
    detecting, in the data information, a time phrase related to the address update clue; and
    determining an absolute time of the address update clue based on the detection result of the time phrase; and
    wherein determining the absolute time of the address update clue based on the detection result of the time phrase comprises:
    in response to the time phrase being an absolute time, determining the absolute time as the time of the address update clue;
    in response to the time phrase being a relative time, converting it into an absolute time as the time of the address update clue;
    in response to not detecting any time term, directly determining the time of release of the data information as the time of the address update clue.

16. The apparatus of claim 15, wherein the data information related to the address update of the named entity when the data information includes a named entity and at least one address update keyword.

17. The apparatus of claim 15, wherein determining the time and the confidence comprises:
    determining based on the degree that the data information is validated, wherein, when the data information has been validated, it has a higher confidence, and when the data information is merely forwarded, it has a lower confidence.

18. The apparatus of claim 15, wherein determining the time and the confidence comprises:
    determining based on the support degree information obtained from comments on the data information.

19. The apparatus of claim 15, wherein determining the time and the confidence comprises
    determining based on authority of an author of the data information.

20. The apparatus of claim 15, wherein determining the address update information comprises:
    selecting an address update clue with the highest confidence and with the time within a predetermined time period.

21. The apparatus of claim 15, wherein determining the address update information comprises selecting the address update clue with the confidence within a predetermined range and with the time being the most recent.

22. The apparatus of claim 15, further comprising determining an address correction operation based on address update keywords in the valid address update clue.

23. The apparatus of claim 22, wherein the address correction operation comprises amending the address.

24. The apparatus of claim 22, wherein the address correction operation comprises adding a new address.

25. The apparatus of claim 22, wherein the address correction operation comprises deleting the address.

26. The apparatus of claim 15, further comprising providing an address change alert.

27. The apparatus of claim 15, further comprising directly updating map data based on the address update information.

28. A non-transitory computer readable article of manufacture tangibly embodying computer readable instructions which, when executed, cause a computer to carry out the steps of a method for obtaining address update information, comprising the steps of:

obtaining data information related to an address update of a named entity;

extracting an address update clue of the named entity from the data information;

determining time and confidence of the address update clue, wherein the time of the address update clue corresponds to an occurrence of an address update event; and determining a valid address update clue based on the time and confidence as the address update information wherein determining the time of the address update clue comprises:

detecting, in the data information, a time phrase related to the address update clue; and determining an absolute time of the address update clue based on the detection result of the time phrase; and wherein determining the absolute time of the address update clue based on the detection result of the time phrase comprises:

in response to the time phrase being an absolute time, determining the absolute time as the time of the address update clue;

in response to the time phrase being a relative time, converting it into an absolute time as the time of the address update clue;

in response to not detecting any time term, directly determining the time of release of the data information as the time of the address update clue.

* * * * *